Patented Nov. 5, 1935

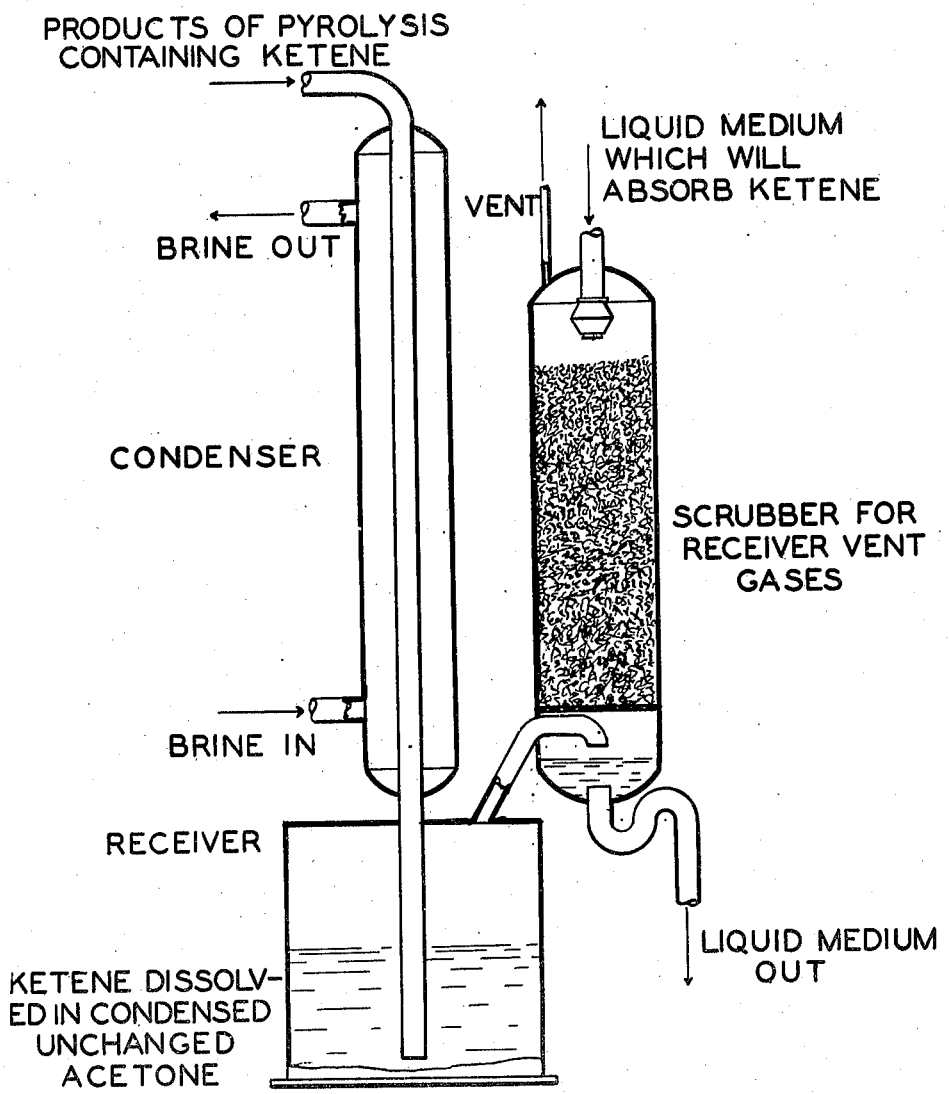

2,019,983

UNITED STATES PATENT OFFICE 2,019,983

PREPARATION OF DIKETENE

George H. Law, South Charleston, W. Va., assignor to Carbide and Carbon Chemicals Corporation, a corporation of New York Application October 14, 1932, Serial No. 637,770

9 Claims. (Cl. 260—131)

The invention is an improved process for making diketene. Diketene, to which has been assigned the formula

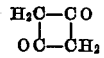

and less generally, the formula,

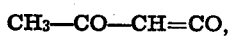

may be obtained by polymerizing simple ketene, $CH_2=CO$. Ketene is a very active substance which polymerizes readily, particularly at slightly elevated temperatures. So far as is known, the dimer, diketene, is the only polymer of ketene which is useful to any extent, hence, in the preparation of diketene, the formation of higher polymers is not desirable. Diketene is a water-white liquid which has an unusual powerful pungent, acrolein-like odor. Diketene is unstable to heat, and requires reduced pressures (below about 100 mm.) for its distillation. It is possible however, to remove acetone from a mixture of acetone and diketene at atmospheric pressure. At a pressure of 12 mm. diketene boils at 30° C. The pure material freezes at —7° to —6° C.

Ketene-containing gases can be formed by the pyrolysis of acetone at 600° to 750° C., and the ketene in such gases will rapidly polymerize at the temperature of pyrolysis to form a large proportion of tarry polymers, but very little diketene. It is therefore necessary in the preparation of diketene to cool the products of pyrolysis quickly, and to avoid heating the diketene after it has been formed.

Diketene has been discussed by various experimenters, and several methods for its preparation have been described. None of the previously known methods have been practicable for the formation of diketene in commercially useful quantities, and diketene itself has been known only as a laboratory curiosity. "Die Ketene" by Staudinger (Stuttgart, 1912) provides a compilation of most of the knowledge of ketenes prior to the date of its publication, and the method of preparing diketene described therein consists in separating the dimer out of a mass of heavy resinous products (pps. 136-7). Since Staudinger's work, the principal references to the preparation of diketene are found in an article by Chick and Wilsmore, Jour. Chem. Soc., 97, 1984, in which ketene is polymerized to form a mixture of heavy polymers containing some diketene which was separated therefrom; and an article by Ott, Schroeter and Packendorff, Jour. f. Prak. Chemie, 130, 177, in which ketene is passed into acetone in cooled wash bottles wherein polymerization occurs. The solutions are then resaturated with ketene and further polymerization takes place rapidly. All of these methods are extremely inefficient because of the losses of ketene incurred by the formation of heavy tarry polymers at the expense of the dimer.

The object of my invention is to provide a process for making diketene which is economically feasible for the preparation of this substance, and which mitigates the disadvantages present in previously known methods for preparing this dimer.

Ketene-containing gases, such as those formed by the pyrolysis of acetone, may be passed into cooled acetone which is being circulated. A dilute solution of ketene is formed which polymerizes to diketene upon standing at ordinary temperatures. In this process considerable ketene is polymerized to tarry polymers due probably to the fact that the solution of ketene is being subjected continuously to the temperature of the products of pyrolysis, at least locally, with resulting polymerization. This process may be varied by passing the gases remaining after the products of pyrolysis have been subjected to an initial condensation which removes most of the acetone, and which consist largely of ketene free from acetone vapor, into acetone contained in a trap which is intensely cooled, as by solid $CO_2$. The solution thus obtained is then allowed to come gradually to room temperature. Solutions containing 15% to 20% of ketene have been so prepared and polymerized to form diketene with the loss of about 10% of the dissolved ketene as tar. Although the solution in this method is several times as concentrated as that in the first instance, less tar is formed, probably because the polymerization proceeds more slowly due to the intense cooling and gradual temperature rise. Also, it is possible to form concentrated ketene solutions by means of pressure as well as refrigeration.

The methods above-described for the preparation of diketene are improvements over the prior art, and may be used for the preparation of this product. The best method found as yet for the preparation of diketene, and the method which I prefer to use is hereinafter described in detail, the system used in my preferred process is diagrammatically shown in the accompanying drawing.

Ketene-containing gases resulting from the pyrolysis of acetone at about 650° C. in a copper converter are passed immediately into a brine-cooled down-draft surface condenser. The products of pyrolysis may contain, by volume, about 8% of ketene, 10% of methane, 3% of ethylene and carbon monoxide, and about 79% of unchanged acetone. The acetone in these hot gases is condensed and the ketene is dissolved therein to form a dilute (less than 7% to 10%) solution of ketene in acetone. This dilute solution leaves the condenser at about $-10°$ C. and is collected in an uncooled receiver. As the temperature of the solution in the receiver rises to atmospheric temperature, the ketene in this dilute solution polymerizes very slowly, giving a good yield of diketene. The non-condensible gases are vented off from the vapor space of the receiver, and, for economy, are scrubbed with a liquid medium which is reactive with or which will absorb ketene, so that any undissolved ketene which escapes with the vent gases is utilized. This scrubbing medium may be water to form acetic acid; acetic or other carboxylic acid to form the corresponding anhydride; an alcohol to form the acetic ester thereof; aniline to form acetanilid or the like. Also, the dilute solution of diketene obtained in the first receiver may be used for scrubbing the vent gases, thereby adding to the ketene or diketene content of the solution.

The process has been described in connection with the use of brine-cooled down-draft condenser. It is unnecessary to employ brine-cooling, but whatever the source of cooling used it must be adequate to quickly cool the products of pyrolysis to a temperature at which polymerization proceeds slowly, say below about 25° C.

Inasmuch as the ketene solution collected in the receiver in actual practice is very dilute, about 4% to 4.5% ketene, the formation of polymers higher than diketene is greatly diminished. This effect in more concentrated solutions is obtained by low temperature polymerization, i. e. below $-50°$ C.

It is essential to use anhydrous acetone for the pyrolysis by which the ketene in my process is made. It is also imperative that water be absent during the polymerization and subsequent distillation of the product. Ketene and diketene both will react with water. For example, if water is present when ketene is formed, acetic acid and acetic anhydride are formed at the expense of the diketene formation. Since the quantity of acetone converted to ketene per pass is relatively small, a very small amount of water in the acetone is sufficient to react with all of the ketene. Thus, 0.9% to 1.0% of water in the acetone will react with all the ketene formed to give acetic anhydride. Less than 0.1% of water in the acetone to be used is preferable.

None of the methods of the prior art for preparing diketene have given any information as to the type of acetone used (where this initial material was employed), since all of the prior methods have employed more concentrated solutions of ketene, and anhydrous acetone was not essential. In all commercial methods for preparing acetone the final step is rectification of an aqueous solution, and due to the well known difficulty in preventing traces of the higher boiling material from distilling over with the lower boiling product, all forms of commercial acetone contain water, and before being used in my process must be especially treated for its removal. This treatment may consist in refluxing the acetone to be used with acetic anhydride, or the same result may be obtained by using acetone recovered from my process which is completely dehydrated by the reaction of ketene or diketenes with any contained water.

In order to avoid undue losses of ketene or diketene by polymerization it is necessary to avoid contact of the materials in my process with iron, nickel or related metals or alloys since these metals promote the polymerization to form useless tarry polymers. Suitable materials of construction may be copper or alloys composed predominantly of copper.

Modifications of my process will be apparent to those skilled in the art, and are included in the invention as defined by the appended claims.

I claim:—

1. Process for making diketene which comprises forming a solution of ketene in acetone and causing the polymerization of said ketene by allowing the temperature of said solution to increase gradually while maintaining said solution under conditions which favor the formation of diketene and which minimize the formation of higher polymers, said conditions being such as to avoid concentrations of ketene greater than about 10% and temperatures above about 25° C. occurring concurrently in said solution.

2. Process for making diketene which comprises forming a solution of ketene in anhydrous acetone of a concentration not substantially greater than about 10% at temperatures below 25° C. and allowing the temperature of said solution to rise gradually whereby diketene is formed.

3. Process for making diketene which comprises forming a solution of ketene in anhydrous acetone containing less than about 7% to 10% of ketene at a temperature of about $-10°$ C. and allowing the temperature of said solution to rise gradually to room temperature whereby diketene is formed.

4. Process for making diketene which comprises forming a solution of ketene in anhydrous acetone containing less than about 4% to 4.5% of ketene at a temperature of about $-10°$ C. and allowing the temperature of said solution to rise gradually to room temperature whereby diketene is formed.

5. Process for making diketene which comprises passing products formed by the pyrolysis of anhydrous acetone through a down-draft surface condenser cooled below about 25° C., collecting the condensed unchanged acetone containing dissolved ketene and allowing the temperature of the collected condensate to rise gradually whereby diketene is formed.

6. Process for making diketene which comprises pyrolizing anhydrous acetone at a temperature between 600° and 750° C., passing the products of pyrolysis through a down-draft surface condenser cooled below about 25° C. whereby a solution of ketene and condensed unchanged acetone is formed and allowing the temperature of said solution to increase gradually to atmospheric temperature.

7. Process for making diketene which comprises pyrolizing anhydrous acetone at a temperature between 600° and 750° C., passing the products of pyrolysis through a down-draft brine-cooled surface condenser whereby a solution of ketene and condensed unchanged acetone is formed, collecting said solution at atmospheric temperature, removing non-condensible gases from said receiver and contacting said removed gases with a liquid medium which will remove ketene from said gases.

8. Process for making diketene which comprises passing ketene into acetone at a temperature below about —50° C. whereby a solution is formed, and allowing the temperature of said solution to increase gradually to atmospheric temperature.

9. Process for making diketene which comprises passing ketene into acetone cooled to the temperature of solid $CO_2$ whereby a solution of ketene is formed and allowing the temperature of said solution to increase gradually to atmospheric temperature.

GEORGE H. LAW.